(12) United States Patent
Takemura (10) Patent No.: US 7,539,992 B2
(45) Date of Patent: May 26, 2009

(54) SCHEDULING METHOD, PROGRAM PRODUCT FOR USE IN SUCH METHOD, AND TASK SCHEDULING APPARATUS

(75) Inventor: Tsukasa Takemura, Yokohama (JP)

(73) Assignee: International Business Machines Corporation, Armonk, NY (US)

( * ) Notice: Subject to any disclaimer, the term of this patent is extended or adjusted under 35 U.S.C. 154(b) by 942 days.

(21) Appl. No.: 10/691,006

(22) Filed: Oct. 22, 2003

(65) Prior Publication Data

US 2004/0093600 A1    May 13, 2004

(30) Foreign Application Priority Data

Nov. 7, 2002    (JP)    ............................. 2002-323392

(51) Int. Cl.
  *G06F 9/46*     (2006.01)
  *G06F 11/00*    (2006.01)
  *G06F 9/44*     (2006.01)

(52) U.S. Cl. ....................... 718/102; 718/106; 717/104; 717/105; 717/108; 717/124; 717/125; 714/38; 703/21; 703/22

(58) Field of Classification Search ......... 717/101–163; 718/100–108; 715/511; 714/38; 703/21–22
See application file for complete search history.

(56) References Cited

U.S. PATENT DOCUMENTS

| | | | | |
|---|---|---|---|---|
| 5,345,579 | A | * | 9/1994 | Hynes ............................ 703/2 |
| 5,375,239 | A | * | 12/1994 | Mortson ...................... 717/140 |
| 5,504,894 | A | * | 4/1996 | Ferguson et al. ................. 707/2 |
| 5,513,357 | A | * | 4/1996 | Mortson ...................... 717/143 |
| 5,604,908 | A | * | 2/1997 | Mortson ...................... 717/163 |
| 5,729,746 | A | * | 3/1998 | Leonard ...................... 717/101 |
| 5,826,236 | A | * | 10/1998 | Narimatsu et al. ............. 705/8 |
| 6,011,918 | A | * | 1/2000 | Cohen et al. ................. 717/106 |
| 6,049,665 | A | * | 4/2000 | Branson et al. ............. 717/108 |
| 6,104,874 | A | * | 8/2000 | Branson et al. ............. 717/108 |
| 6,256,773 | B1 | * | 7/2001 | Bowman-Amuah ......... 717/121 |

(Continued)

FOREIGN PATENT DOCUMENTS

WO    97/07472 A1    2/1997

OTHER PUBLICATIONS

Tim Pyron, Special Edition Using Microsoft 2000, 2000, Que, Chapter 1.*

(Continued)

*Primary Examiner*—Lewis A Bullock, Jr.
*Assistant Examiner*—Jennifer N To
(74) *Attorney, Agent, or Firm*—Jerry W. Herndon, Esq.; Steven M. Greenberg, Esq.; Carey Rodriguez Greenberg & Paul LLP (57)    ABSTRACT

A task generation unit extracts classes forming a system from design information of the system designed on an object-oriented basis and generates tasks corresponding to the extracted classes. A dependency setting unit extracts dependency between the classes from the design information of the system and sets dependency between the corresponding tasks on the basis of the dependency. A workload estimation unit extracts complexity of the classes from the design information of the system and estimates workload required for implementation of the classes on the basis of the complexity. A Gantt chart generation unit schedules the tasks on the basis of the above information.

1 Claim, 12 Drawing Sheets

U.S. PATENT DOCUMENTS

| | | | |
|---|---|---|---|
| 6,405,364 B1* | 6/2002 | Bowman-Amuah | 717/101 |
| 6,442,748 B1* | 8/2002 | Bowman-Amuah | 717/108 |
| 6,662,357 B1* | 12/2003 | Bowman-Amuah | 717/120 |
| 6,735,762 B2* | 5/2004 | Fujikawa et al. | 717/141 |
| 6,938,240 B2* | 8/2005 | Charisius et al. | 717/104 |
| 6,978,401 B2* | 12/2005 | Avvari et al. | 714/38 |
| 7,039,912 B1* | 5/2006 | Moulden et al. | 718/100 |
| 7,107,403 B2* | 9/2006 | Modha et al. | 711/129 |
| 7,139,999 B2* | 11/2006 | Bowman-Amuah | 717/101 |
| 7,210,119 B2* | 4/2007 | Pothos et al. | 717/102 |
| 7,266,808 B2* | 9/2007 | Kolawa et al. | 717/126 |
| 7,299,382 B2* | 11/2007 | Jorapur | 714/38 |
| 7,343,587 B2* | 3/2008 | Moulden et al. | 717/124 |
| 2001/0052108 A1* | 12/2001 | Bowman-Amuah | 717/1 |
| 2002/0078432 A1* | 6/2002 | Charisius et al. | 717/102 |
| 2003/0041087 A1* | 2/2003 | Pothos et al. | 709/102 |
| 2005/0257136 A1* | 11/2005 | Charisius et al. | 715/511 |
| 2006/0206870 A1* | 9/2006 | Moulden et al. | 717/124 |

OTHER PUBLICATIONS

Craig Larman, Applying UML and Patterns: An Introduction to Object-Oriented Analysis and Design and the Unified Process, Second Edition, Jul. 13, 2001, Prentice Hall, Sample UML Notation section.*

Clay, "Software Testing and the UML", pp. 1-2, IBM T. J. Watson Research Center, 1999.*

Bertolino et al. "Real-Time UML-Based Performance Engineering to Aid Manager's Decisions in Multi-Project Planning", pp. 251-261, ACM, 2002.*

Wikipedia, "Unified Modeling Language", pp. 1-5.*

Villarreal, "The Application of Activity Based Management to a Software Engineering Environment", pp. 551-559, IEEE, 1993.*

Gimenes et al., "An Object Oriented Framework for Task Scheduling", pp. 1-13, IEEE, 2000.*

Baresi et al., "Wide Workflow Development Methodology", pp. 19-28, ACM, 1999.*

Gimenes et al., "Enterprise Frameworks for Workflow Management Systems", pp. 1-16, John Willey & Son, LTD, 2002.*

Gimenes et al., "An Object Oriented Framework for Task Sceduling", IEEE, 2000, pp. 1-15.*

Pastor et al., "The OO-Method Approach for Information Systems Modeling: From Obeject-Oriented Conceptual Modeling to Automated Programing", Elsevier, 2001, pp. 1-28.*

* cited by examiner

SCHEDULING METHOD, PROGRAM PRODUCT FOR USE IN SUCH METHOD, AND TASK SCHEDULING APPARATUS

TECHNICAL FIELD

The present invention relates to a mechanical task scheduling method for scheduling implementation or test tasks in an object-oriented system development.

BACKGROUND OF THE INVENTION

There is a Unified Modeling Language (UML™) as a notation method for describing an object-oriented system design (for example, "*UML 2001: A Standardization Odyssey*" by Cris Kobryn; Communications of the ACM; October 1999; Vol. 42; No. 10). Recently there have been growing analyses and designs using UML™ in an object-oriented system (including an organization or a project) development.

In implementing a system designed by using UML™, the order of implementation need to be determined on the basis of dependency between classes. For example, if there is an inheritance relation between classes, a parent class needs to be implemented earlier than dependent child classes. If there is an ownership relation between classes, an owned class need be implemented earlier than an owning class.? In other words, a depended class is implemented earlier than a depending class. It is the same in testing the system; the depended class need be tested earlier than the depending class.

Conventionally, for system implementation and testing, a task schedule has been generated manually by determining the order of implementation or of testing of classes while implementing classes in parallel for those that can be implemented in parallel to improve efficiency of the development, considering various dependency between classes.

As set forth above, to implement or test a system designed by using UML™, conventionally the task schedule has been generated manually for their execution.

Along with the recent popularization of object-oriented technologies, more and more large-scale systems comprising a huge number of classes are being developed. In this sort of large-scale system, dependency between classes forming the system is complicated, by which a determination of the order of implementing or testing classes is difficult, time consuming and prone to error. Therefore, if the task schedule is generated manually in the large-scale system, an oversight of the dependency between classes may occur, which may result in an inefficient schedule insufficiently reflecting the dependency between classes.

Therefore, it is an object of the present invention to provide a method of scheduling tasks from system design information such as a UML™ class diagram mechanically without manual labor and to achieve automatic task scheduling for implementing or testing of a system using the method.

SUMMARY OF THE INVENTION

To accomplish the above object, the present invention is embodied in a scheduling method for scheduling tasks providing a system designed on an object-oriented basis as described below. More specifically, according to one aspect of the invention, the scheduling method comprises a first step of extracting classes forming the system from system design information described by using UML™ or the like, generating tasks corresponding to the extracted classes, and storing information on the generated tasks into a given storage device, a second step of extracting dependency between the classes from the system design information, setting the dependency between the corresponding tasks on the basis of the dependency, and storing information on the set dependency between the tasks into the given storage device, and a third step of scheduling the tasks on the basis of the information on the tasks stored in the given storage device in the above steps and the information on the dependency between the tasks.

According to another aspect of the invention, there is provided a scheduling method comprising, a first step of extracting classes forming the system from system design information, generating tasks corresponding to the extracted classes, and storing information on the generated tasks into a given storage device, a second step of extracting complexity of the classes from the system design information, estimating workload required for implementation of the classes on the basis of the complexity, and storing a result of the workload estimation into the given storage device, and a third step of scheduling the tasks on the basis of the information on the tasks stored in the given storage device in the above steps and the result of the workload estimation.

To accomplish the above object, according to still another aspect of the invention, there is provided a task scheduling apparatus, comprising the following: a task generation unit for extracting classes forming a system from design information of a system designed on an object-oriented basis and generating tasks corresponding to the extracted classes; a dependency setting unit for extracting dependency of the classes from the system design information and setting the dependency between the corresponding tasks on the basis of the dependency; a workload estimation unit for extracting complexity of the classes from the system design information and estimating workload required for implementation of the classes on the basis of the complexity; and a scheduling unit for scheduling the tasks on the basis of the information.

If dependency between the tasks is set from the dependency between the classes in the above scheduling method or in the functions of the task scheduling apparatus, more specifically, if there is a relation in which a development of one class requires an earlier development of the other class, the dependency is set in such a way that a task corresponding to one class concerned is started after termination of a task corresponding to the other class concerned. If there is an interdependence relation between given classes, the dependency is set in such a way that each task is terminated after awaiting tasks corresponding to all the classes in the interdependence to be ready for terminating. Note that, however, the interdependence relation is assumed to include a ring dependency relation among three or more classes as well as the interdependence relation between two classes.

In the workload estimation, more specifically, the workload is estimated by a multivariate analysis such as a multi-regression analysis using past workload achievements in each class. The terms "past workload" includes workload at development of other systems developed in the past and workload applied before in the same system.

More preferably, a Gantt chart may be generated and output with a description of a schedule generated as described above.

Still further, the present invention can be provided as a program for causing a computer to execute processes corresponding to respective steps of the above scheduling method or for controlling the computer to perform the functions of the above task scheduling apparatus. The program can be provided by being stored in and distributed by means of a magnetic or optical disk, a semiconductor memory, or other recording mediums or by being distributed via a network.

DETAILED DESCRIPTION

The present invention will now be described in detail hereinafter on the basis of the preferred embodiments shown in the accompanying drawings.

Figure 1:
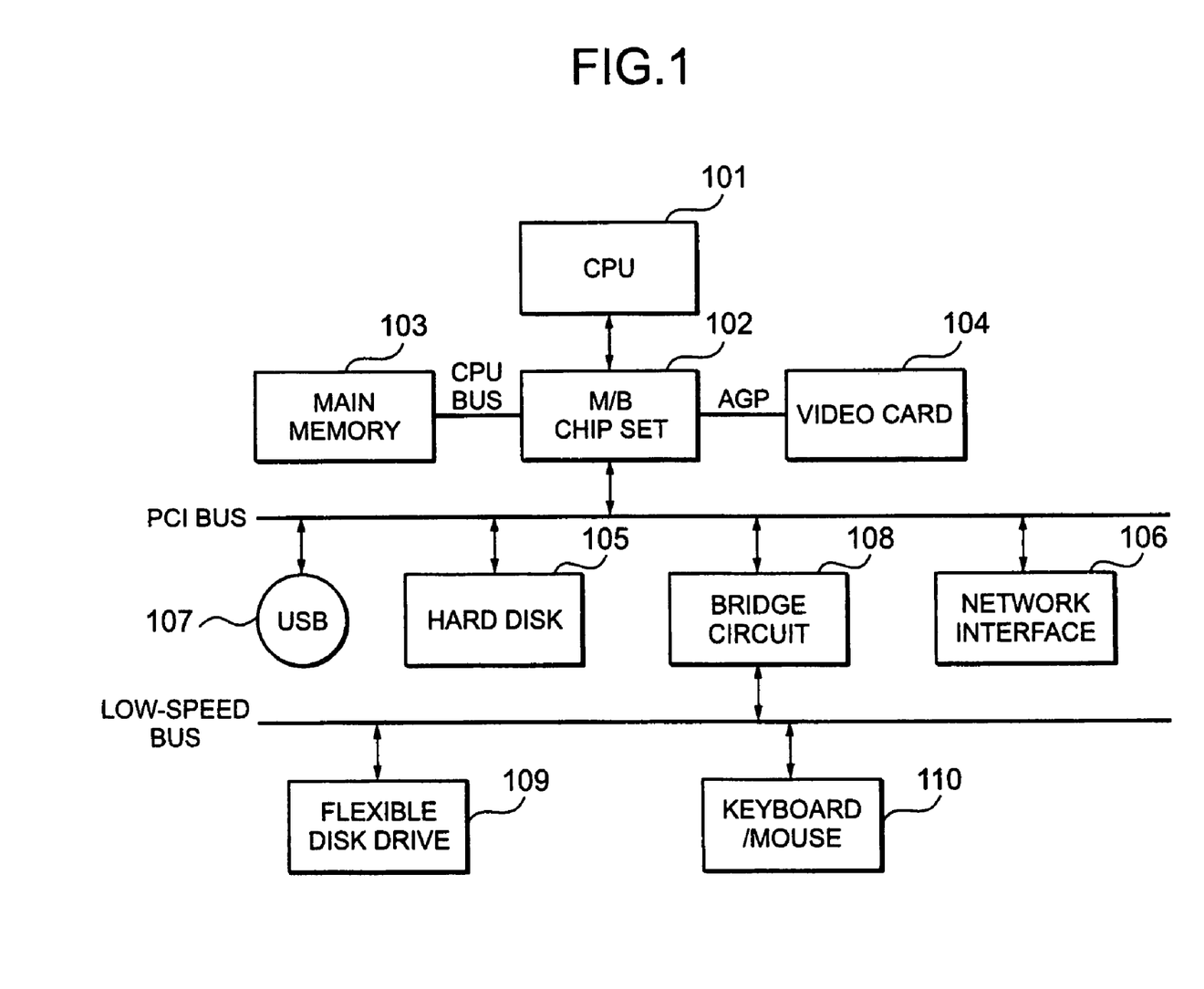
FIG. 1 is a diagram schematically showing an example of a hardware configuration of a computer preferable for achieving automatic task scheduling according to this embodiment.

Referring to FIG. 1, there is shown a diagram schematically illustrating an example of a hardware configuration of a computer preferable to realize automatic task scheduling according to this embodiment.

The computer shown in FIG. 1 comprises: a central processing unit (CPU) 101 as a calculating means; a main memory 103 connected to the CPU 101 via a motherboard (M/B) chip set 102 and a CPU bus; a video card 104 connected to the CPU 101 via the motherboard chip set 102 and an accelerated graphic port (AGP); a hard disk 105, a network interface 106, and a USB port 107 connected to the motherboard chip set 102 via a peripheral component interconnect (PCI) bus; and a flexible disk drive 109 and a keyboard/mouse 110 connected to the motherboard chip set 102 from the PCI bus via a bridge circuit 108 and a low-speed, industry standard architecture (ISA) bus.

Note that, however, FIG. 1 only illustrates a hardware configuration of the computer realizing this embodiment and therefore other various configurations can be used if this embodiment is applicable to them. For example, the computer may have a configuration in which only a video memory is mounted instead of the video card 104 and the CPU 101 processes image data or in which a compact disc read only memory (CD-ROM) or digital versatile disc read only memory (DVD-ROM) drive is provided via an interface such as an AT attachment (ATA).

Figure 2:
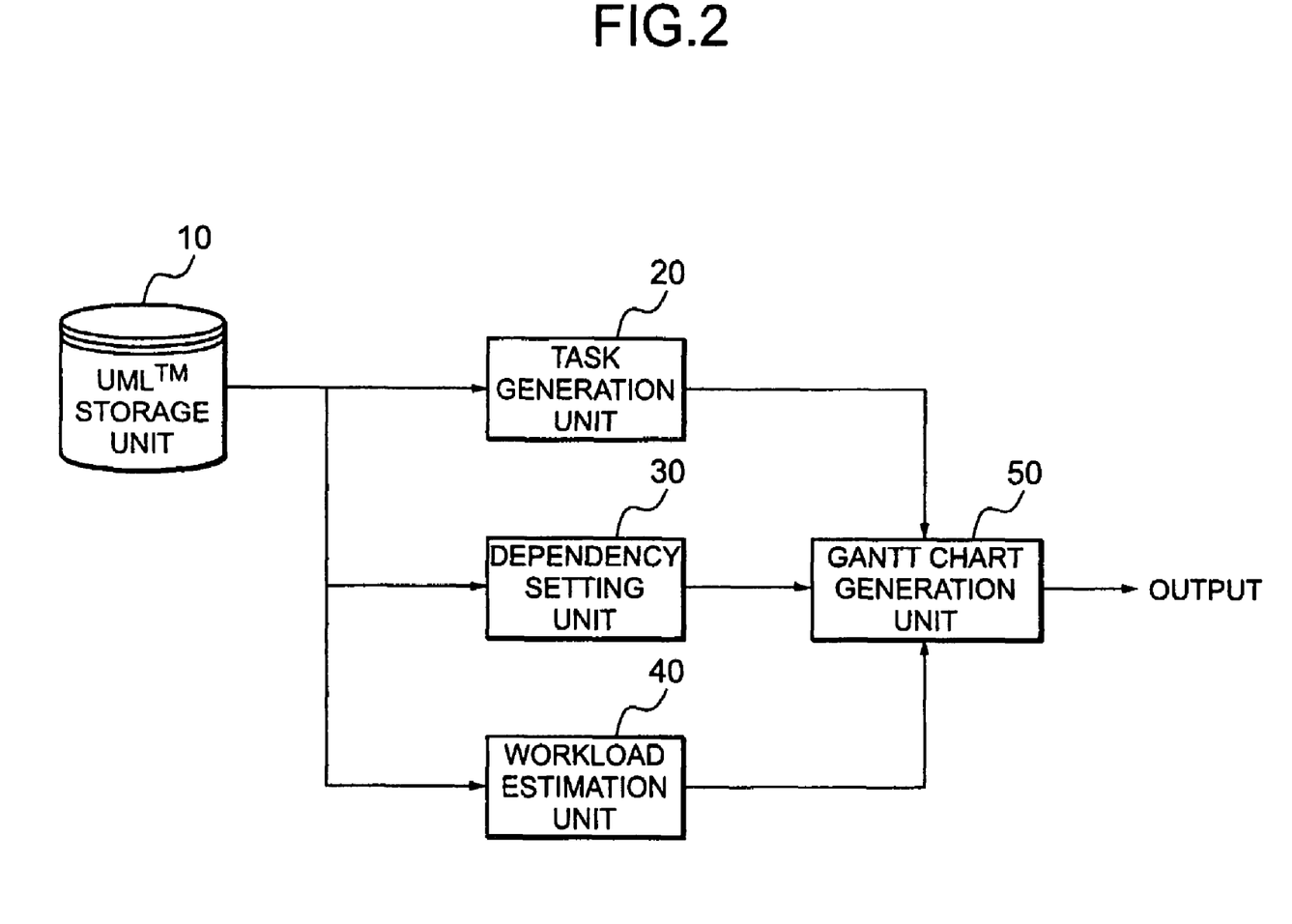
FIG. 2 is a diagram showing a functional configuration of a task scheduling apparatus according to this embodiment.

Referring to FIG. 2, there is shown a functional configuration of the task scheduling apparatus according to this embodiment.

With reference to FIG. 2, the task scheduling apparatus of this embodiment comprises a UML™ storage unit 10 storing a system design (class diagram) described in UML™, a task generation unit 20 for generating tasks by extracting classes and packages from the UML™ class diagram, a dependency setting unit 30 for extracting dependency between classes in the UML™ class diagram and setting the dependency of the tasks, a workload estimation unit 40 for estimating workload required for implementation of the classes from the complexity of each class in the UML™ class diagram, and a Gantt chart generation unit 50 for generating a Gantt chart on the basis of information obtained by the task generation unit 20, the dependency setting unit 30, and the workload estimation unit 40.

In the configuration shown in FIG. 2, the UML™ storage unit 10 is embodied in the main memory 103 or the hard disk 105 in the computer shown in FIG. 1, for example. The task generation unit 20, the dependency setting unit 30, the workload estimation unit 40, and the Gantt chart generation unit 50 are embodied in the program-controlled CPU 101.

The program controlling the CPU 101 to perform these functions is stored in and distributed by means of a magnetic or optical disk, a semiconductor memory, or other recording mediums or distributed via a network when it is provided. In the computer shown in FIG. 1, the program is stored (installed) in the hard disk 105 and then read into the main memory 103 and loaded to control the CPU 101 for performing the above various functions.

The following describes the functions of the task scheduling apparatus shown in FIG. 2.

The task generation unit 20 reads the class diagram intended for task scheduling from the UML™ storage unit 10 and extracts classes forming the class diagram and a package containing the classes according to the UML™ notation method. It then generates tasks corresponding to the extracted classes and the package. In this embodiment, the task schedule is output as a Gantt chart and therefore the extracted classes and the package are represented by tasks in the Gantt chart. A class name of an extracted class, for example, is used as a task name. Tasks of the classes included in a parent package and child packages are represented as subtasks of a task representing the parent package. Information on the generated tasks is stored in a given area of the main memory 103 or in a cache memory of the CPU 101 in the computer shown in FIG. 1, for example.

Referring to FIG. 3, there are shown the UML™ class diagram illustrating a relation between the parent package and child classes and a diagram illustrating a representation of their tasks.

Figure 3A:
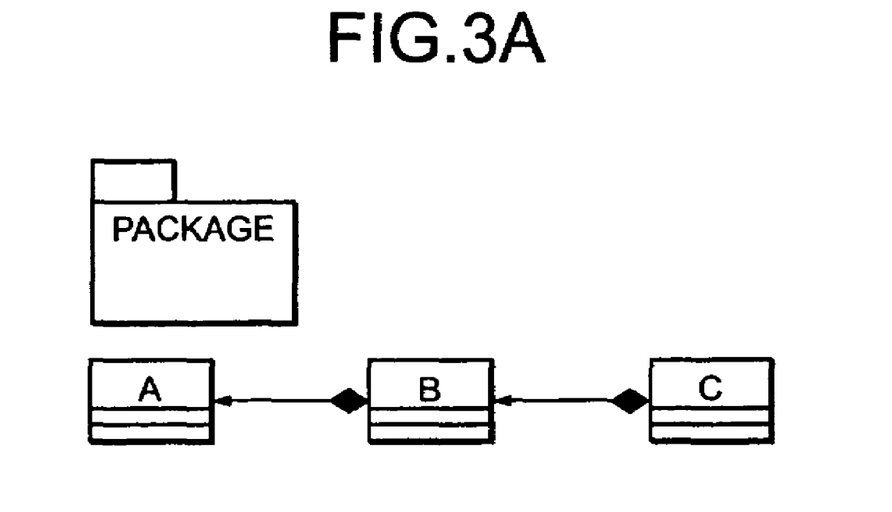
FIG. 3 is a diagram showing a UML™ class diagram illustrating a relation between a parent package and child classes and a diagram illustrating a representation of their tasks.
Figure 3B:
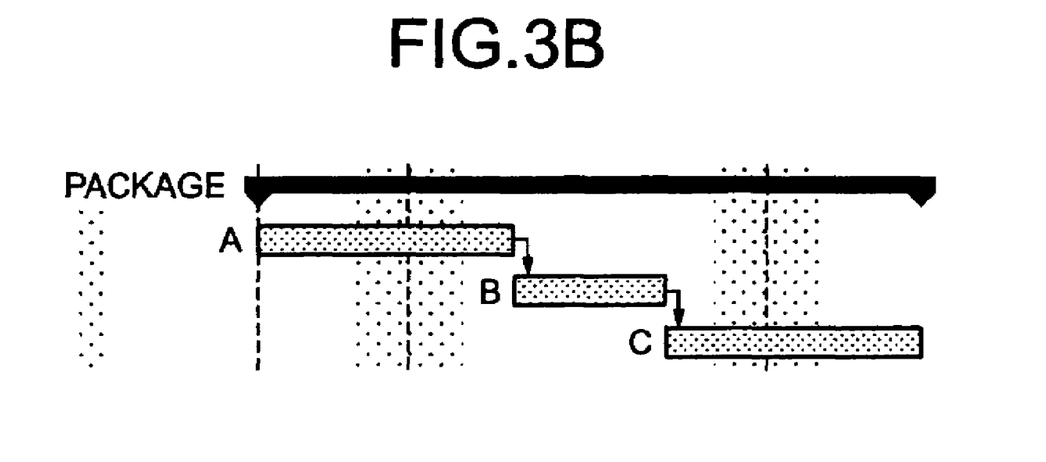

As shown in FIG. 3A, the package contains classes A, B, and C. In the representation of the tasks in the Gantt chart, the tasks A, B, and C are subtasks of the task indicating the package as shown in FIG. 3B.

The dependency setting unit 30 extracts dependency between the classes forming the class diagram according to the UML™ notation method from the UML™ class diagram read from the UML™ storage unit 10 by the task generation unit 20. It then converts (sets) the dependency between the extracted classes to the dependency between the tasks generated by the task generation unit 20. Information on the set dependency between the tasks is stored in a given area of the main memory 103 or the cache memory of the CPU 101 in the computer shown in FIG. 1, for example.

As the dependency between the classes, the following relations between classes are extracted from the class diagram in this embodiment. They are the inheritance, realization, ownership (aggregation or composition), dependence, association (interdependence), relation of having another class as a class attribute, and relation of using another class as an argument of a class method (operation).

The above dependency between the classes will be described in more detail.

In the inheritance, a child class is dependent on a parent class. In other words, the child class is a depending class and the parent class is a depended class. In this instance, the child class inherits operations or attributes defined in the parent class and therefore the parent class must be developed first. Accordingly, in the corresponding tasks in the Gantt chart, there is a dependency relation in which a task for developing the depending class is started after termination of a task for developing the depended class ("end-start")?.

Referring to FIG. 4, there is shown a diagram illustrating classes in the inheritance relation and a representation of their tasks.

Figure 4A:
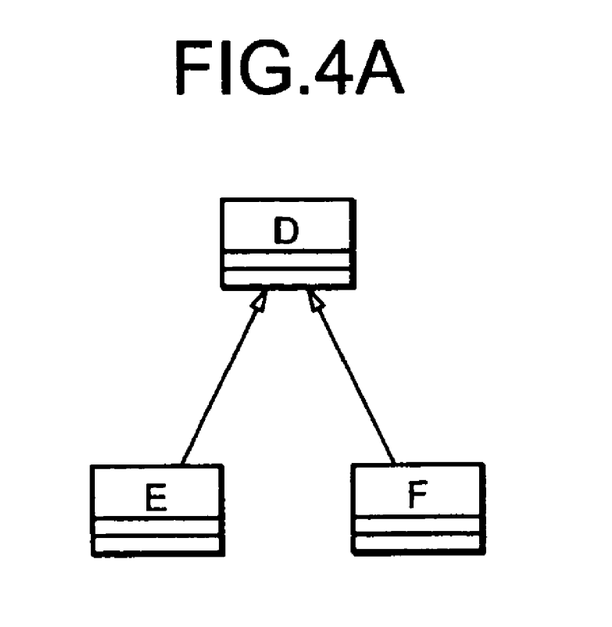
FIG. 4 is a diagram showing classes in an inheritance relation and a representation of their tasks.
Figure 4B:
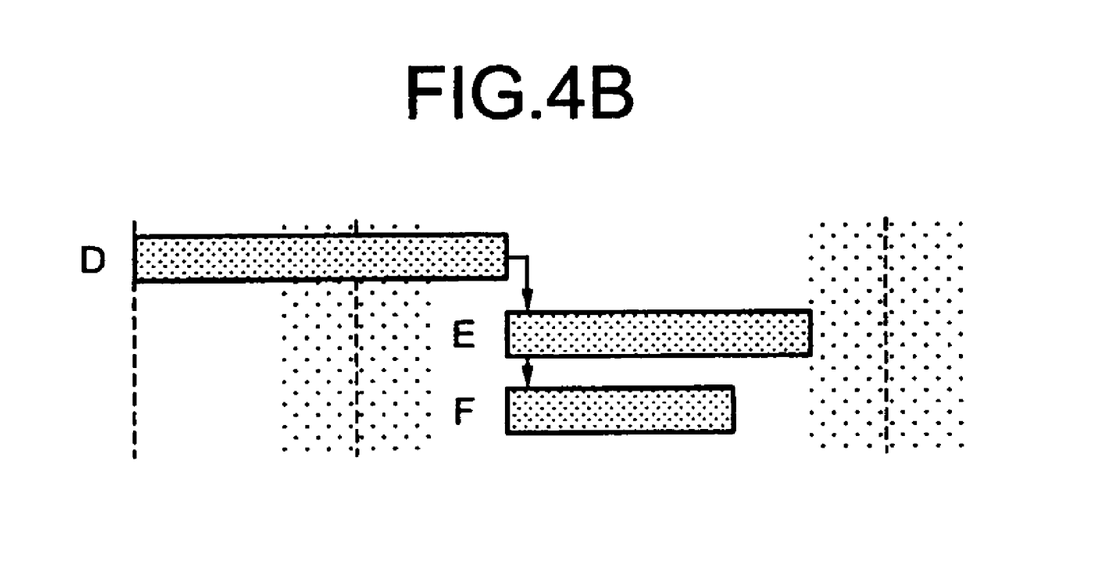

If classes E and F are child classes inheriting from a parent class D as shown in FIG. 4A, a dependency relation between tasks is set in such a way that tasks E and F of the child classes are dependent on a task D of the parent class in the "end-start" relation as shown in FIG. 4B.

In the realization, an implementation class is dependent on an interface class. In other words, the implementation class is a depending class and the interface class is a depended class. In the implementation class in this instance, an operation defined in the interface class is implemented and therefore the interface class should be defined earlier. Accordingly, in the corresponding tasks in the Gantt chart, there is a dependency relation in which a task for developing the depending class is started after termination of a task for developing the depended class in the same manner as in the inheritance.

In the ownership (aggregation or composition), an owning class is dependent on an owned class. In other words, the owning class is a depending class and the owned class is a depended class. In this instance, the owned class is implemented as an attribute of the owning class. More specifically, an operation for accessing the owned class needs to be implemented in the owned class. For this implementation, the owned class should be developed earlier. Accordingly, in the corresponding tasks in the Gantt chart, there is a dependency relation in which a task for developing the depending class is started after termination of a task for developing the depended class in the same manner as in the inheritance and the realization.

Referring to FIG. 5, there is shown a diagram illustrating classes in the aggregation and a representation of their tasks.

Figure 5A:
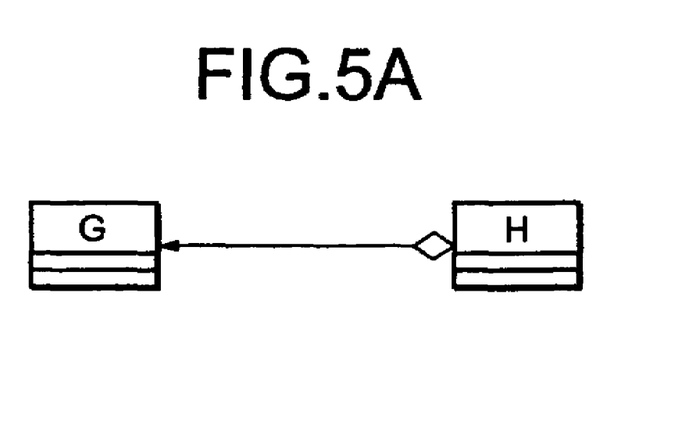
FIG. 5 is a diagram showing classes in an aggregation relation and a representation of their tasks.
Figure 5B:
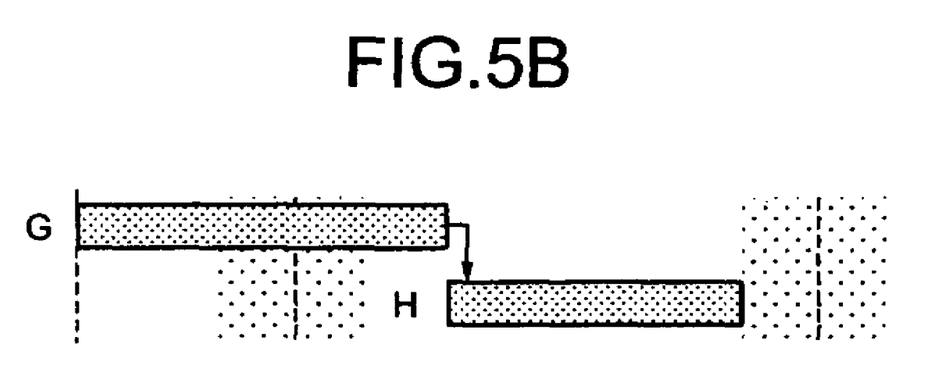

If a class H owns a class G (aggregation) as shown in FIG. 5A, a dependency relation between tasks is set in such a way that a task H is dependent on a task G in the "end-start" relation as shown in FIG. 5B.

Referring to FIG. 6, there is shown a diagram illustrating classes in the composition and a representation of their tasks.

Figure 6A:
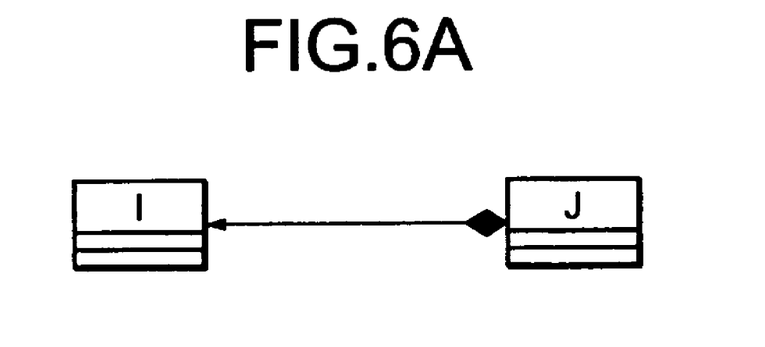
FIG. 6 is a diagram showing classes in a composition relation and a representation of their tasks.
Figure 6B:
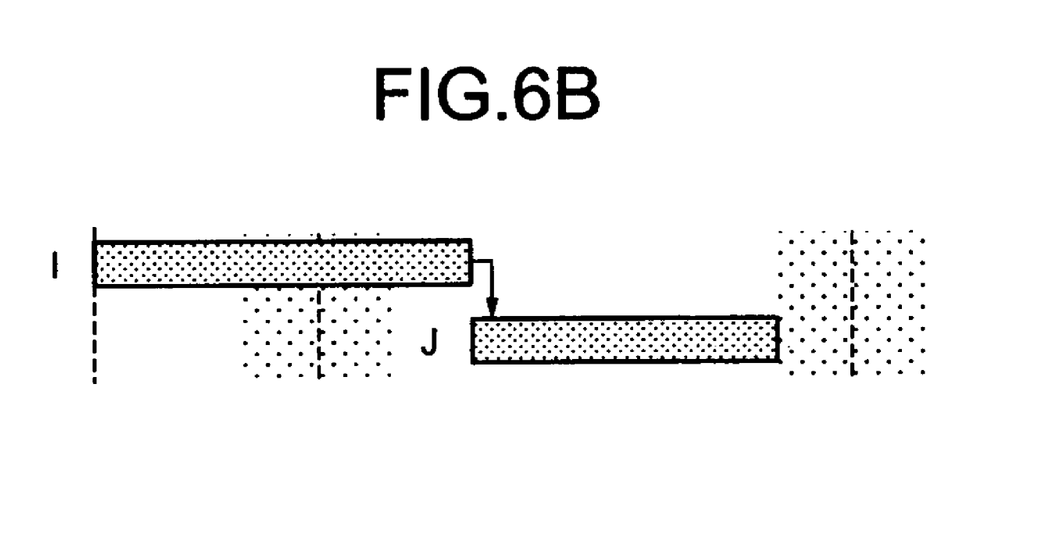

If a class J owns a class I (composition) as shown in FIG. 6A, a dependency relation between tasks is set in such a way that a task J is dependent on a task I in the "end-start" relation as shown in FIG. 6B.

In the dependence, a depending class is independent on a depended class. In this instance, the depending class generally uses the depended class and therefore the depended class is necessary for implementation of the depending class. Accordingly, in the corresponding tasks in the Gantt chart, there is a dependency relation in which a task for developing the depending class is started after termination of a task for developing the depended class ("end-start").

Referring to FIG. 7, there is shown a diagram illustrating classes in the dependence and a representation of their tasks.

Figure 7A:
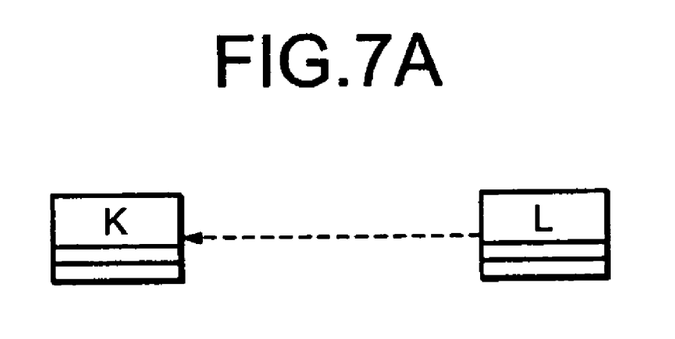
FIG. 7 is a diagram showing classes in a dependence relation and a representation of their tasks.
Figure 7B:
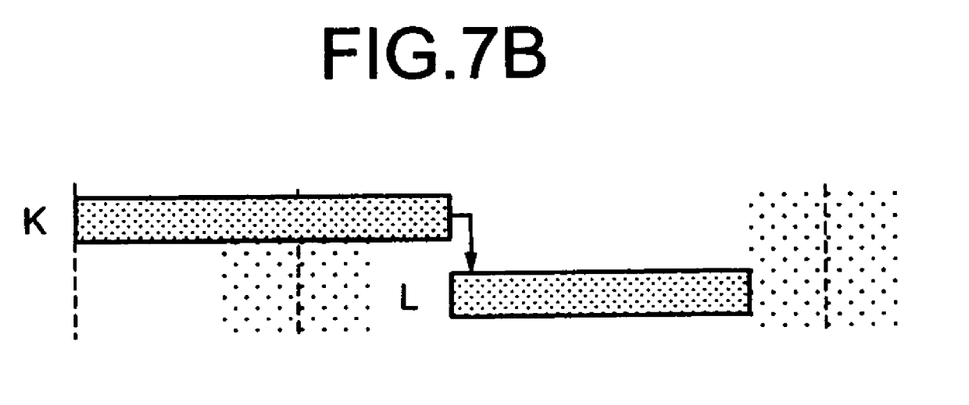

If a class L depends on a class K as shown in FIG. 7A, a dependency relation between tasks is set in such a way that a task L is dependent on a task K in the "end-start" relation as shown in FIG. 7B.

In the association (interdependence), a plurality of classes are dependent on each other. Therefore, when implementation of all the classes have been terminated, they can be tested. Accordingly, in the corresponding tasks in the Gantt chart, each task is considered terminated only after all the tasks are terminated (dependent in the "end-end" relation).

Referring to FIG. 8, there is shown a diagram illustrating two classes in the interdependence and a representation of their tasks.

Figure 8A:
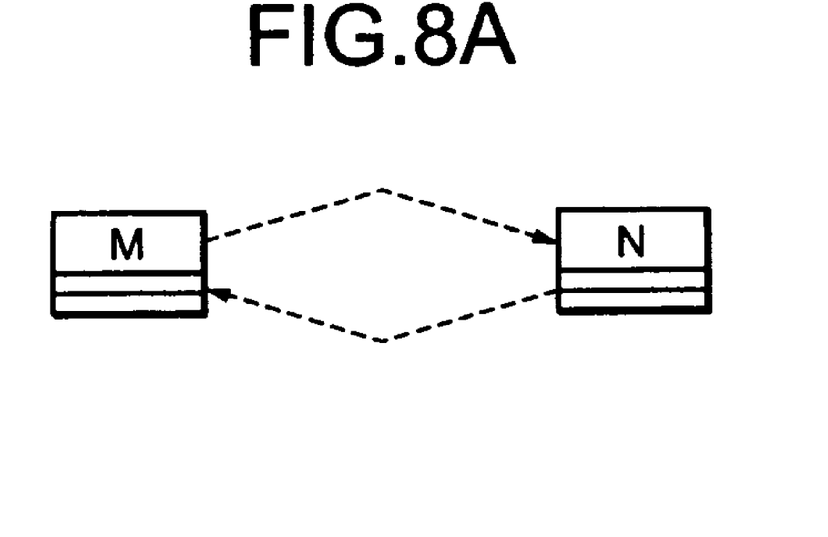
FIG. 8 is a diagram showing two classes in an interdependence relation and a representation of their tasks.
Figure 8B:
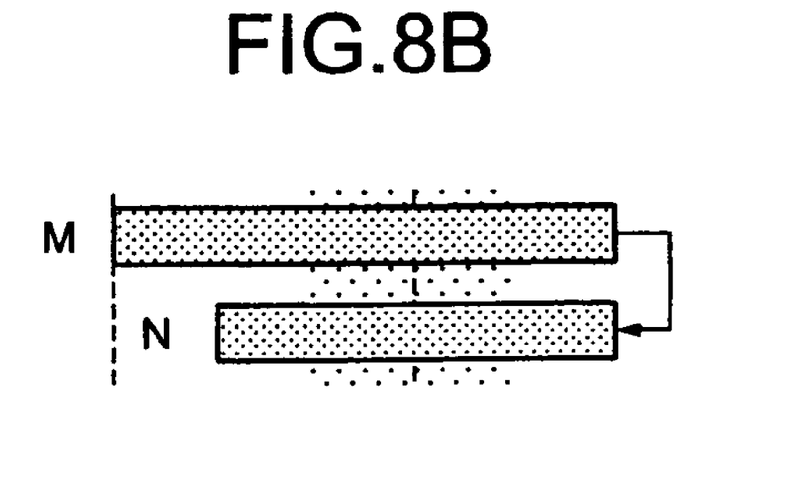

If a class M and a class N are dependent on each other as shown in FIG. 8A, a dependency relation between tasks is set in such a way that a task M and a task N are dependent on each other in the "end-end" relation as shown in FIG. 8B. In other words, even if the task M is ready to terminate earlier, for example, it should not be terminated, but put in a standby state. Only after the task N becomes ready to terminate, the tasks M and N terminate together.

Although FIG. 8 shows the interdependence of two classes, the interdependence in the association includes the ring dependency among three or more classes. In this instance, the classes are terminated when all the classes forming the circular dependency are ready to terminate (dependent in the "end-end" relation).

In the relation of having another class as a class attribute, the class having the attribute is dependent on the class to be the attribute. More specifically, the class having the attribute is a depending class and the class to be the attribute is a depended class. In this instance, an operation for accessing the class to be the attribute is implemented in the class having the attribute. For this implementation, the class to be the attribute should have been developed earlier. Accordingly, in the corresponding tasks in the Gantt chart, there is a dependency relation in which a task for developing the depending class is started after termination of a task for developing the depended class ("end-start").

Referring to FIG. 9, there is shown a diagram illustrating classes in the relation of having another class as a class attribute and a representation of their tasks.

Figure 9A:
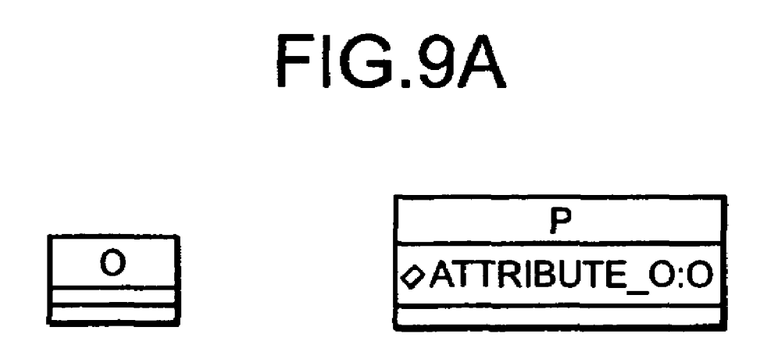
FIG. 9 is a diagram showing classes in a relation of having another class as a class attribute and a representation of their tasks.
Figure 9B:
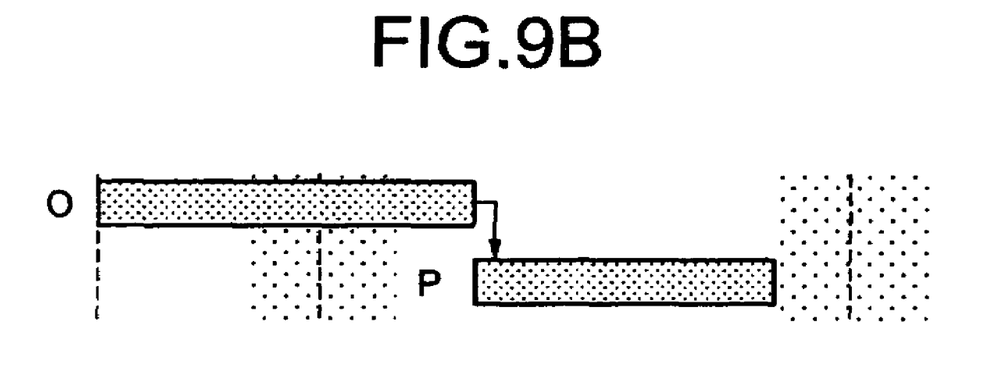

If a class P has a class O as an attribute as shown in FIG. 9A, a dependency relation between tasks is set in such a way that a task P is dependent on a task O in the "end-start" relation as shown in FIG. 9B.

In the relation of using another class as an argument of a class method (operation), the class having the method (operation) is dependent on the class to be an argument. More specifically, the class having the method (operation) is a depending class and the class to be the argument is a depended class. In this instance, to define and implement the method (operation), the class to be the argument should have already been defined and implemented. Accordingly, in the corresponding tasks in the Gantt chart, there is a dependency relation in which a task for developing the depending class is started after termination of a task for developing the depended class ("end-start").

Referring to FIG. 10, there is shown a diagram illustrating classes in the relation of using another class as an argument and a representation of their tasks.

Figure 10A:
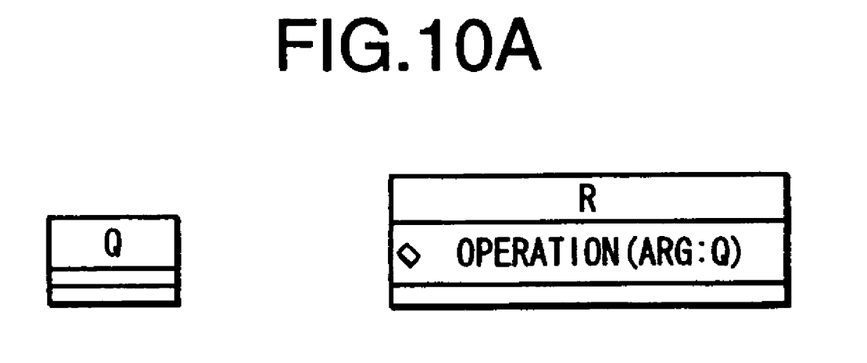
FIG. 10 is a diagram showing classes in a relation of using another class as an argument of a class method (operation) and a representation of their tasks.
Figure 10B:
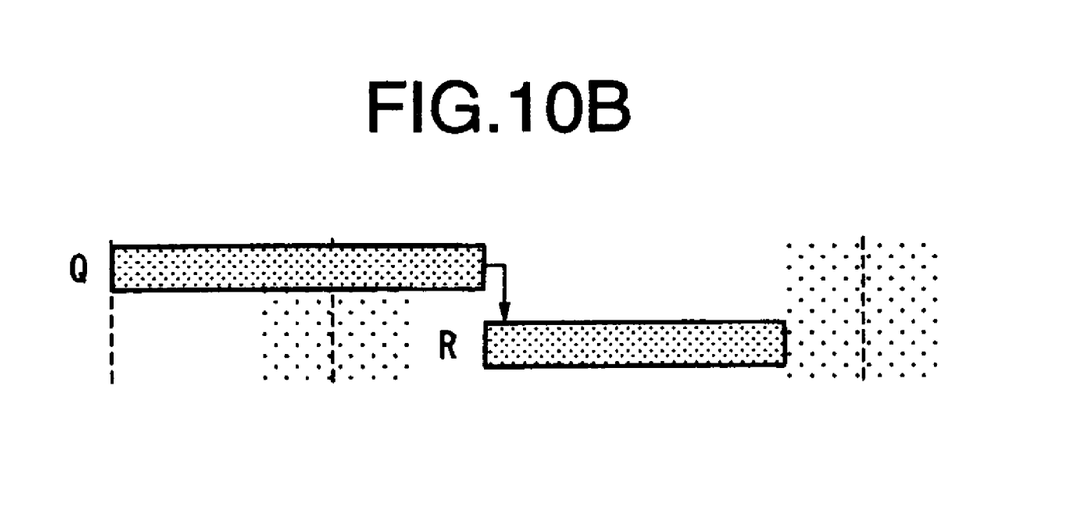

If a class Q is used as an argument of a method (operation) of a class R as shown in FIG. 10A, a dependency relation between tasks is set in such a way that a task R is dependent on a task Q in the "end-start" relation as shown in FIG. 10B.

The workload estimation unit 40 checks complexity of the classes forming the class diagram according to the UML™ notation method on the basis of the UML™ class diagram read from the UML™ storage unit 10 by the task generation unit 20. It then estimates the workload required for the implementation of the classes on the basis of the complexity of the obtained classes. The workload estimation is necessary for considering a time scale in the task scheduling and particularly indispensable for implementing given classes in parallel. A result of estimating the workload of the classes is stored in a given area of the main memory 103 or the cache memory of the CPU 101 in the computer shown in FIG. 1, for example.

At this point, the complexity of the classes is assumed to be the following information obtained in connection with each individual class: the number of attributes (variables or the like) in the class, the number of operations (methods) in the class, the total number of arguments in the operations in the class, the association count of the class, the aggregation or composition count of the class, the dependence count of the class, the inheritance count of the class, and the realization count of the class. These (parameters) are necessary information for estimating the workload of each class, but the present invention is not limited to them. If there is any other information effective for estimating the workload of the classes, it can also be included in the complexity parameters of the classes.

The workload can be estimated by using the multivariate analysis method such as a multi-regression analysis. More specifically, when a specific class has been implemented or tested, achievements of the workload in the implementation or testing can be used for estimating workload required for implementing or testing the same class in another system development or in a modification of the same system. In this instance, the workload required for implementation of each class is estimated by using achievements of workload at development in another system developed in the past or workload applied before in the same system (these are generically referred to as past workload) with the following relational expression (multiple regression expression):

Workload $W = f$(the association count of the class)$+g$ (the number of attributes in the class)$+h$ (the number of methods in the class)$+i(\Sigma$(the number of arguments in the methods))

In the above expression, functions f, g, h, and i are dependent on the technology, experience, or development environment of a developed product and therefore they are determined by using a statistical method such as a multivariate analysis on the basis of achievements related to these parameters in the past workload.

The Gantt chart generation unit 50 is a schedule generation unit for scheduling implementation tasks and test tasks from dependency between tasks generated by the task generation unit 20 and tasks set by the dependency setting unit 30 and a result of workload estimation made by the workload estimation unit 40. In this embodiment, the generated schedule is described in a Gantt chart and output. Referring to FIGS. 3B, 4B, 5B, 6B, 7B, 8B, 9B, and 10B, there are shown sample Gantt charts reflecting the dependency between tasks.

If implementation tasks and test tasks terminate to be scheduled for a given class diagram as described below, the Gantt chart generation unit 50 sets a dependency relation in which the implementation task starts after termination of the test task in each class ("end-start" relation). The dependency relation is also reflected on the Gantt chart.

Figure 11:
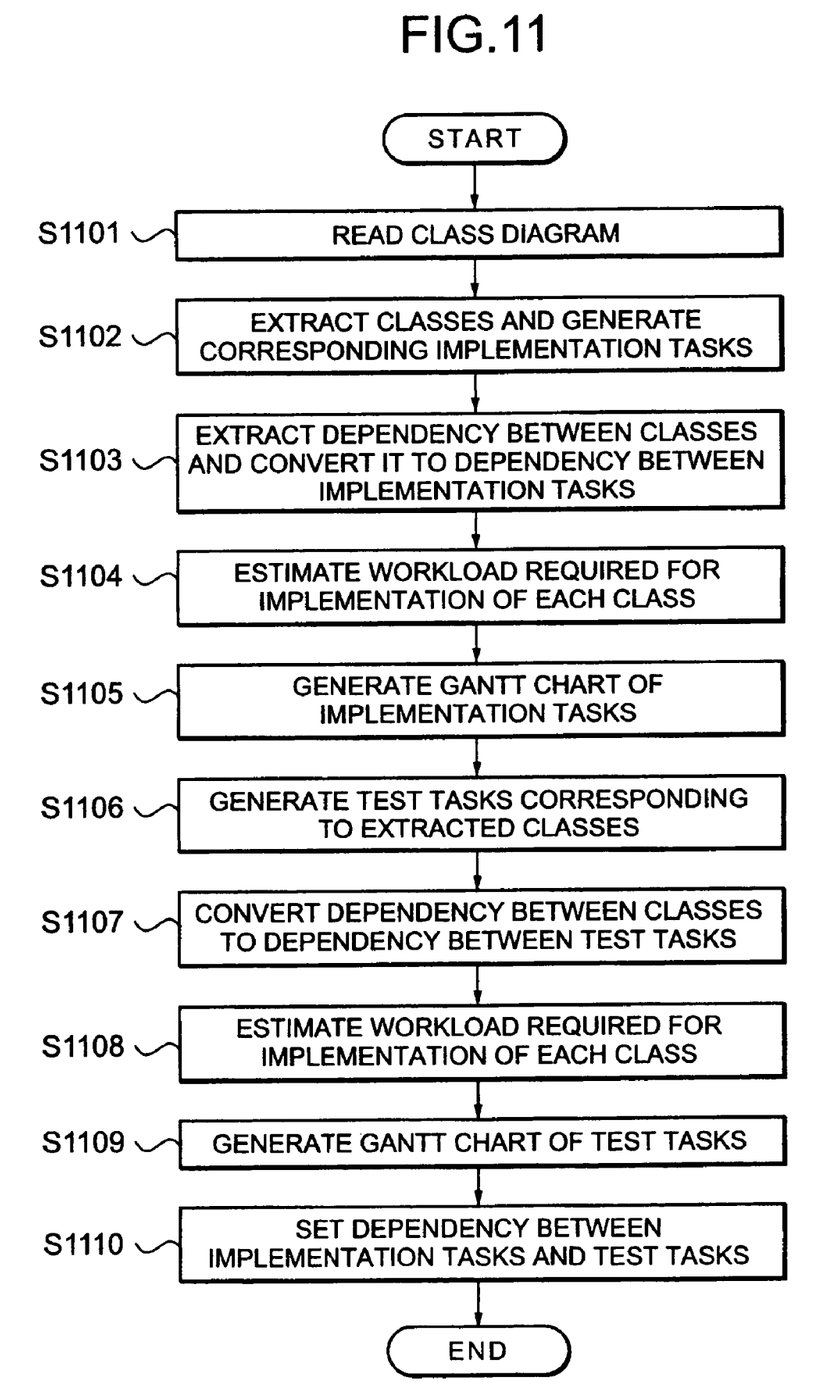
FIG. 11 is a flowchart of assistance in explaining the operation of the implementation task and test task scheduling in this embodiment.

Referring to FIG. 11, there is shown a flowchart of assistance in explaining the operation of scheduling the implementation tasks and the test tasks using the task scheduling apparatus configured as described above.

With reference to FIG. 11, the task generation unit 20 first reads out class diagrams intended for scheduling from UML™ class diagrams stored in the UML™ storage unit 10 (step 1101). Classes forming an appropriate class diagram are then extracted and the corresponding implementation tasks are generated (step 1102).

Subsequently the dependency setting unit 30 extracts dependency relations between classes forming a class diagram to be processed and then sets a dependency relation (the start timing and the termination timing) between implementation tasks corresponding to the classes on the basis of the extracted dependency (step 1103).

Subsequently the workload estimation unit 40 estimates workload required for implementation of classes forming the class diagram to be processed (step 1104).

The Gantt chart generation unit 50 then generates a schedule (a Gantt chart) of the implementation tasks reflecting the dependency between the implementation tasks generated in the step 1102 and the implementation tasks set in the step 1103 and the workload required for implementing each individual class estimated in the step 1104 (step 1105).

Thereafter, in the same method, the task generation unit 20 generates a test task (step 1106), the dependency setting unit 30 sets dependency between test tasks (step 1107), and the workload estimation unit 40 estimates workload (step 1108), by which a schedule (Gantt chart) of the test task is generated (step 1109).

Finally, the Gantt chart generation unit 50 sets the dependency between the tasks in such a way that the implementation task depends on the test task in the "end-start" relation in each class, so that the Gantt chart reflects it (step 1110).

While the present invention has been described on the assumption that the relation between the class and the implementation task or the test task is a one-to-one correspondence, there may be a case where a plurality of tasks are derived from a single class. For example, it is a case where an interface class coding task, an implementation class coding task, and a class unit test task are derived from a given class. The dependency setting unit 30 in this embodiment is capable of setting dependency between tasks in this case.

Figure 12:
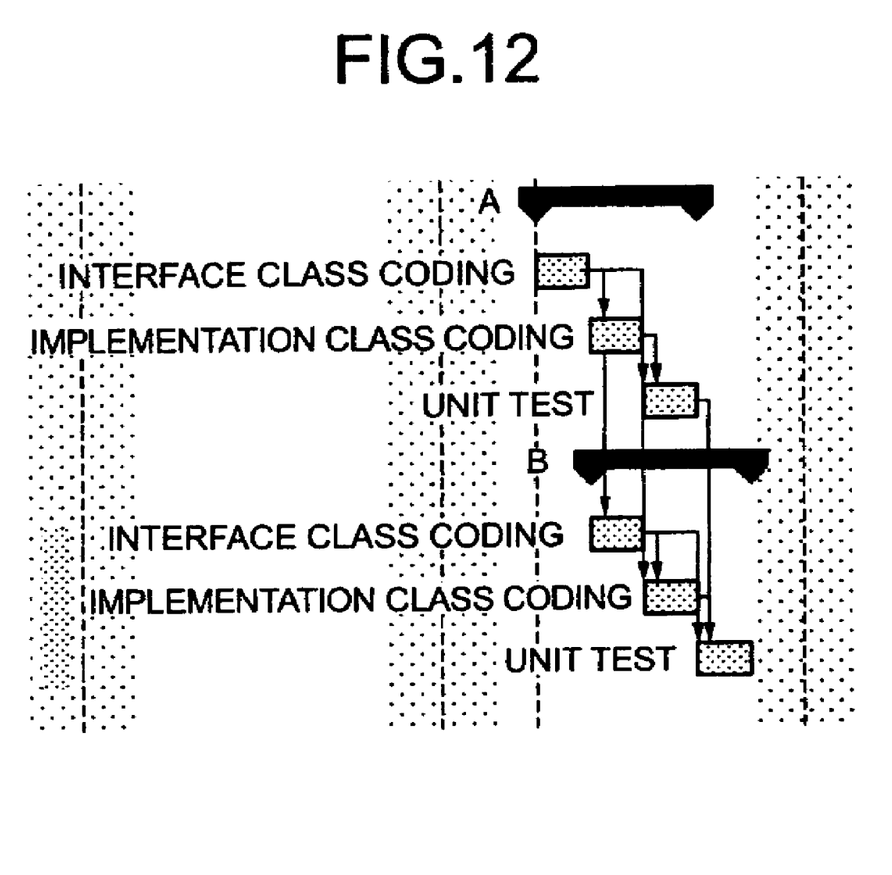
FIG. 12 is a diagram showing an example of a task schedule (Gantt chart) when a plurality of tasks are derived from a single class.

Referring to FIG. 12, there is shown an example of a task schedule (Gantt chart) in the above case.

In FIG. 12, a task A is a test task corresponding to the given task and a task B is an implementation task corresponding to the same class. Each of the tasks A and B has an interface class coding, an implementation class coding, and a unit test as subtasks.

In this instance, the dependency setting unit 30 sets a dependency relation in such a way that the implementation class coding starts after termination of the interface class coding and the unit test starts after termination of the implementation class coding as shown. The Gantt chart generation unit 50 sets a dependency relation in such a way that the interface class coding of the class B starts after termination of the interface class coding of the class A, the implementation class coding of the class B starts after termination of the implementation class coding of the class A, and the unit test of the class B starts after termination of the unit test of the class A. As shown, the tasks are implemented in parallel wherever possible (more specifically, complying with the dependency relation between tasks and within parallel implementation range).

As described hereinabove, complicated and detailed task scheduling can be mechanically performed according to this embodiment.

While the above embodiment has been described by using a system design (class diagram) described in UML™ as an object of task scheduling, a task schedule can be generated on the basis of object-oriented system design information described upon a given rule other than UML™. More specifically, the task schedule is generated by generating tasks with extracting classes forming the system on the basis of a notation method of appropriate design information, setting a dependency relation of the tasks on the basis of a dependency relation between the classes, and estimating workload of the classes.

While the generated task schedule is described in a Gantt chart and it is output finally in the above embodiment, the Gantt chart is only a form of representation of the generated task schedule. Appropriately another drawing method can be used to describe the task schedule and to output the drawing or the generated task schedule can be used as data in a given management system for use in a schedule management for system development.

As set forth hereinabove, according to the present invention, an implementation or test task schedule can be mechanically generated from system design information such as a UML™ class diagram without manual labor.

I claim:

1. A scheduling method for scheduling tasks providing a system designed on an object-oriented basis by using a computer, comprising:
   a first step of extracting classes forming said system from design information of the system, generating tasks corresponding to the extracted classes, and storing information on the generated tasks into a given storage device;
   a second step of extracting complexity of the classes from the design information of said system, estimating workload required for implementation of the classes on the basis of the complexity, and storing a result of the workload estimation into the given storage device; and
   a third step of scheduling the tasks on the basis of the information on the tasks stored in said given storage device and the result of the workload estimation, wherein
   in said second step, past workload achievements in each class are used to estimate the workload of the classes.

* * * * *